United States Patent [19]

Delmege et al.

[11] Patent Number: 4,850,011

[45] Date of Patent: Jul. 18, 1989

[54] KEY TELEPHONE SYSTEM PROVIDING SELECTION OF KEY OR PBX OPERATIONAL MODES

[75] Inventors: James W. Delmege, North Chili; David J. Day, Victor, both of N.Y.

[73] Assignee: Redcom Laboratories, Inc., Victor, N.Y.

[21] Appl. No.: 143,903

[22] Filed: Jan. 13, 1988

[51] Int. Cl.$^4$ .............................................. H04M 1/72
[52] U.S. Cl. .................................... 379/157; 379/201
[58] Field of Search ............... 379/157, 201, 234, 233; 370/66, 62, 68

[56] References Cited

U.S. PATENT DOCUMENTS 4,228,536 10/1980 Gueldenpfennig .................... 370/66
4,229,816 10/1980 Breidenstein ........................ 370/100
4,588,864 5/1986 Carter et al. ......................... 379/157

OTHER PUBLICATIONS

Motorola Telecommunications Device Data (1985) pp. 2-324 to 2-355.

Primary Examiner—Stafford D. Schreyer
Attorney, Agent, or Firm—Martin LuKacher

[57] ABSTRACT

A key telephone system which provides both key and private branch exchange (PBX) operational modes utilizes a plurality of digital telephone station sets which communicate with line circuits connected to a time division multiplex (TDM) telephone switching system. A single pair of leads (tip and ring) connect each station set to the line circuits. The TDM switching system has a processor with an operating system which carries out the processes which provide for the selection of key and PBX features. The TDM switching system also provides access to trunk lines which connect the telephone station sets via the TDM switching system to other switching systems, such as the central office of the public utility telephone company. In the station sets and in the line circuits, there are provided channels for signalling data and for PCM data. The PCM data may be voice, codes, or digital data. Line interfaces are connected to the lead pairs from the station sets to line circuits and transmit and receive multibit digital messages containing signalling bits and PCM code bits. The signalling messages on one of the signalling channels represent the status of the keys, and control data for indicators (light emitting devices) and a display (LCD display on two lines) where alphanumeric characters as to call originations and the status of certain lines in the system may be displayed. These messages both signal and control the key features and the PBX features as and when selected by the keys; the signalling bits of the messages being compiled to provide the control data used in the station sets and transferred to the TDM switching system.

14 Claims, 7 Drawing Sheets

PORT AND ARBITRATOR INTERACTION

ALL WORK IS ACCOMPLISHED THROUGH THE MESSAGE HANDLING CAPABILITIES OF THE OPERATING SYSTEM THE ORIGINATION PORTION OF THE KEY SET IS CONTROLLED BY THE "ITC", "OTG" AND "INC" KEYS.

MESSAGE SUMMARY:

ORIGNIATING LINE OF TRUNK TO ARBITRATION PROCESS

1) ADD KEY CALL
          ARBITRATION REACTION - ENQUEUE CALL FOR FIRST IN FIRST OUT BEHAIVOR AND SEND MESSAGE WHICH CAUSES ACTIVATION OF CALL WAITING LED ON KEY SET AND RINGING IF APPROPRIATE.

2) REMOVE KEY CALL
          ARBITRATION REACTION - DELETE CALL FROM QUEUE AND UPDATE ALL KEY PHONES W / STATUS MESSAGE    KEY SET TO ARBITRATION PROCESS       1) IM AVAILABLE FOR A CONNECTION
          ARBITRATION REACTION - INFORM LONGEST WAITING CALL OF THE AAVAILABLE PARTY AND REMOVE THE CALL FROM QUEUE THIS MESSAGE IS GENERATED IF "ITC" AND "INC" ARE ACTIVE.

ARBITRATIOR TO KEY SET

1) QUEUE STATUS
         KEY SET REACTION - RINGING ON OR OFF AS APPROPRIATE AND ILLUMINATION / FLASHING OF THE CALL WAITING LED

ARBITRATOR TO ORIGINATING PORT

1) NOTICE OF AVAILABLE KEY PHONE
         PORT REACTION - BEGIN PORT TO PORT MESSAGE CONNECTION PROTOCOL

KEY TELEPHONE SYSTEM PROVIDING SELECTION OF KEY OR PBX OPERATIONAL MODES

The present invention relates to key telephone systems and particularly to a key telephone system wherein the telephone station sets are connected to a private branch exchange (PBX) and provide a key operational mode or a PBX operational mode so that features which can be best accomplished in key mode can be obtained in that mode and other features which can be best accomplished in PBX mode can be obtained by selecting the PBX operational mode.

By features is meant call handling functions. Key features include: enabling access only to incoming calls (calls to a group of stations or to a particular station); enabling outgoing (outside) calls by connection directly to a trunk line, without dialing an access digit (such as nine) as in PBX calling; and distribution of incoming calls to a key group or pilot number so that for example the incoming traffic is distributed with the longest waiting call being given the first key phone to come off hook so long as that phone (station) is enabled to receive incoming calls. Another key mode feature may be call waiting indication, when an incoming call is directed to the key group number; the call waiting indicator flashing at an increasing rate as the number of unanswered incoming calls increases. PBX features by way of example are automatic call back, call forwarding, call holding, call parking, call pickup, conferencing, shuttling, redial, speed dialing, and etc. Such features involve the dialing of special access number or symbols or combinations of numbers and symbols.

Conventional key systems, such as the well known 1A2 phone with illuminated key buttons, require a button for each line. Such systems may involve arrangements of key phones connected ahead of or bridging the PBX. Accidental bridging often occurs and the user can inadvertently pick up a call which is not wanted. Conventional key phones cannot be restricted to answering service or to outgoing service.

It is an object and advantage of a key telephone system in accordance with this invention to provide outgoing key service which automatically selects an available trunk line (e.g. a central office circuit) without the need for one button per trunk line and the requirement to select a key (button) upon each origination. Accidental bridging onto an ongoing conversation, for example as a result of having left a key depressed and subsequently lifting the handset, are avoided.

Another object and advantage of the key system embodying the invention is to selectively enable the acceptance of incoming traffic directed to a station or within a group (key group) of stations thereby allowing for centralized answering. A call waiting visual indicator per phone is illuminated and the incoming calls are automatically sequenced or distributed. Ringing of incoming calls can be restricted to one or more phones in the group. The first phone to answer will receive the call in the priority in which multiple calls are registered (enqueued). Separate buttons are not needed for each line. Selection of several potential ringing lines as in conventional key phones and receiving unwanted calls is avoided.

Still another object and advantage of a key system embodying the invention is the use of only three keys, namely an ITC key for selecting either key or PBX modes, and incoming (INC) and outgoing (OTG) keys which are selected when the station is in the key mode to enable access to incoming or outgoing traffic, exclusively. When an OTG key is selected the phone is connected directly to the trunk line (central office) without the need for dialing an access digit, as in the PBX mode. When OTG is selected the station will not receive incoming traffic. Both OTG and ITC keys may be selected. Then incoming calls are enabled and outgoing calls are also enabled, with incoming calls handled before an outgoing origination is allowed. When neither OTG or INC keys are selected both incoming and outgoing service is inactive. The user will "hand out", a condition similar to the condition in a 1A2 key phone where the handset is picked up with no buttons pressed. The user then makes a selection to press INC or OTG, to press or release ITC and enter key or PBX mode, or to dial a station number and bridge onto a trunk line or internal line call which is in progress.

Another feature and advantage of the key telephone system is accordance with the invention is the ability to hold calls without extra keys either in PBX or key mode by pressing a hold key and dialing a number (pressing a number on the keypad). A multiplicity of calls can be held with each calling party on a different hold number.

It is still another object and advantage of the invention to provide an alphanumeric display which registers and displays different characters and words identifying incoming traffic. The display will identify incoming calls as calls to the key group if a pilot number is dialed (the word KEY being displayed) or the symbol STA for calls directed to the station. The display will provide a letter or symbol indicating whether the originating call is from a local or internal line or from a trunk line; the letters L or T or a word combination, for example LOOP-11, indicating local line or trunks. The number of the local line can be displayed. The display can have a second row of alphanumeric symbols that identify the status of certain stations in the system, for example the station assigned to a supervisor, an attendant or other coworkers. Symbols such as I for idle, B for busy, R for ringing, F for forwarding, V for vacation will be registered and displayed in the respective position on the status line of the display.

It is another object and advantage of the invention to provide for integrated key and PBX operation with a wide variety of PBX features, such as call forwarding, speed dialing, and other features which are mentioned above in connection with the PBX mode of operation.

Briefly described, a key telephone system embodying the invention includes telephone station sets connected to a time division digital electronic switching system having a processor which controls the making of connections between lines including internal lines connected to the station sets and outside trunk lines. The system provides both key and PBX modes of operation utilizing a plurality of keys on each station set including a key (ITC) for selecting between key and PBX modes, a key (OTG) for selecting access to the outside trunk lines and a key (INC) for selecting access to incoming calls directed to a particular station set and to a group of a plurality of station sets identified by a common pilot number. The system includes means for translating the status of the keys and the PCM codes corresponding to information to be transmitted by the station sets into multibit digital messages including first signalling bits representing the status of the keys and second signalling bits representing the status of telephone functions such as hookswitch which conditions of the station sets and the plurality of PCM code bits. The PCM code bits can carry voice and data or high speed data as may be selected by a voice/data key on the station set. Means are provided in each of the sets for establishing a plurality of channels respectively for signals corresponding to signalling messages consisting of the first signalling bits, signalling messages consisting of the second signalling bits, and messages consisting of the PCM codes. Computer controller means in each of the station sets are responsive to the messages in the signalling data channels for controlling the operation of the telephone station sets. Line circuit means are connected to the time division switching system and have means for transmitting and receiving the messages from the telephone station sets. Each line circuit means has signalling channels for messages consisting of the first and second signalling bits (preferably separate channels) and a channel for the PCM codes. The line circuit means also has computer controller means responsive to the messages transmitted by the signalling channels for transmitting messages to and receiving messages from the time division switching system processor for operating the station sets in accordance with the status of the ITC, OTG and INC keys in key mode or in PBX mode to provide the features selected by the keys in each such mode.

The foregoing objects and advantages of the invention, as well as other objects and advantages thereof, and a presently preferred embodiment of the invention, will become more apparent from a reading of the following description in connection with the accompanying drawings in which:

Figure 1:
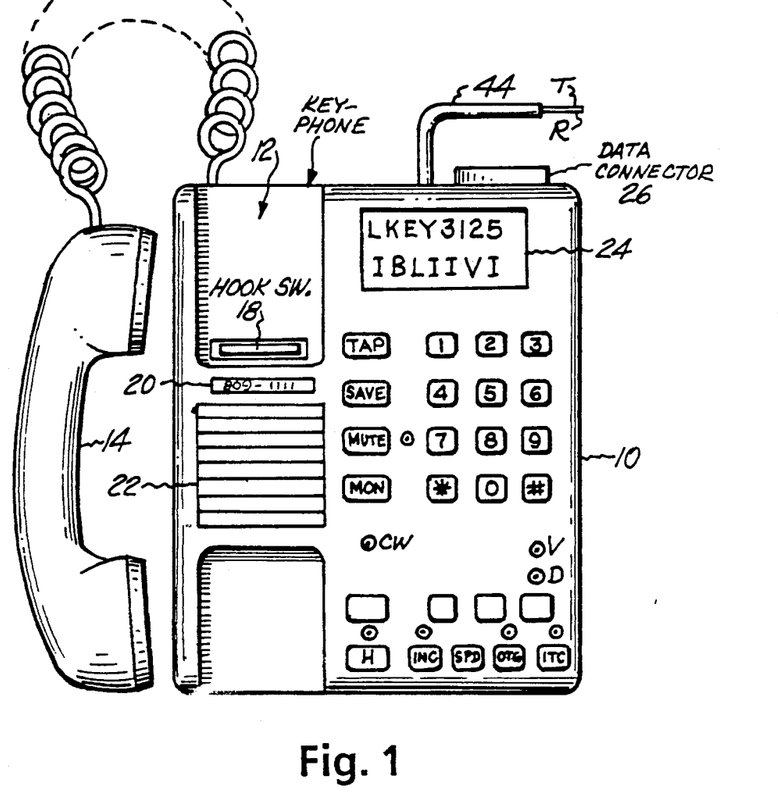
FIG. 1 is a plan view of a key phone or station set with the handset out of the cradle; the key phone being used in a key telephone system embodying the invention.

Referring to FIG. 1 there is shown a key phone 10. This device is also referred to as a station or station set. It includes a housing having a cradle portion 12 for a handset 14 which is connected via a line and jack to a telephone set interface circuit 16 of the circuitry in the housing (see FIG. 2). A hookswitch 18 has an operator which is exposed from one end of the cradle. There are holders for removable slips for numbers, line indications and button identification, except where the button or key is marked on the surface thereof. Only one of such holders 20 which has a slip bearing the number of this station is indicated. There is also a speaker underneath a grill 22 for use where hands free operation or communication with a group surrounding the key phone (so called squawk box operation) is desired.

A LCD or liquid crystal display having two lines 24 is provided on the face of the housing. One of these lines displays alphanumerics as to the incoming traffic (and also may display the outgoing telephone number which is dialed) and the other line displays the status letters of a plurality of different circuits. In the illustrated case the letter L indicates that an internal line is originating the call. The word key indicates that it is a call to the key group including this station and the digits 3125 indicate the number of the calling line. The lower line has letters, I, B, L and V each indicating the status of a line which is monitored at this station. I means that the monitored line is idle or on-hook. B means that it is busy, L means that it is locked out for certain calls and V is a special code indicating that the user of that line is on vacation. Other status symbols may be displayed.

There are twelve buttons of a keypad or dialer which are designated with the conventional numbers and symbols. The letter combinations next to each number are omitted to simplify the illustration.

There are a series of vertical keys alongside the dialer. The TAP key initiates a hook flash of predetermined duration for flagging incoming PBX feature codes. The TAP is known as a recall key. The SAVE key is used to initiate and terminate a speed dial number SAVE function. The MUTE key and a visual indicator (e.g. a light emitting diode or LED) adjacent to the MUTE key is used for muting the microphone on the handset so as to allow private conversations without disrupting the connection (going on hook). The MON or monitor key enables the hands free operation and connects the speaker instead of the handset through usual vox circuits to the telephone set interface 16. Another indicator lamp may be placed next to the monitor key. This lamp is not shown to simplify the illustration.

There are two rows of keys below the keypad. In the first row three are blank. These represent keys which are dedicated to certain speed dial numbers for example the line for the users spouse (also known as soft keys). Of course more or less keys for specific numbers may be used. The arrangement of the keys is a matter of convenience and of attractive design, and is not critical.

The first line contains at the end of the line a voice/data key. Above this line there are two LED's which are respectively illuminated when voice transmission or data transmission are selected. The system is on the voice channel when the voice indicator is lit. Both channel indicators can be lit and both voice and data can be transmitted. A data connector 36 which may be an RS-232 connector connects the station 10 to a data line. The station set functions as a terminal or modem for transmission of data and reception of data. Data is transmitted at a lower rate, in this example 8 kilobits per second (Kbps) when the data mode is selected. However, higher speed data at a rate, in this example of 64 Kbps, may be transmitted, in which case voice data will not be transmitted, when a special data selection switch which may be located at the bottom of the housing of the station set is used. This switch selects 64 Kbps synchronous data. The system may be conditioned by controlling the data interfaces 26 and 28 (FIG. 2) to handle data at various baud rates (e.g., 300, 1200, 2400, 4800, or 9600 baud) and with automatic answering service using the data selection switch.

The second or lower row of keys consists of the ITC key with its indicator which toggles the station set between PBX and key operating modes. The key phone is in key mode when the indicator above the ITC key is lit. Next is the OTG or outgoing access key with its indicator. The next key from right to left is the speed dial key which is used to select the speed dial function while storing a multiplicity of entries, each including up to a multiplicity of digits for personal memory dialing. The next button with its indicator is the INC key for enabling the phone in key mode to receive incoming calls. The final key on the left in the bottom row is the Hold key. By pressing this key and a button on the keypad a multiplicity of calls can be placed on hold. No two calls can be placed on the same number.

The ITC key toggles between key mode and PBX mode, offering station users access to both key group functions and PBX call handling features. When the ITC indicator is lit, key mode operation is activated. When the ITC indicator is off, PBX mode operation is activated.

The ability to answer and originate calls while in key mode is controlled by the ITC and OTG keys. These key functions are beneficial to the user for quick handling of incoming calls, as well as rapid access to a trunk for outgoing calls. The effect of these keys in key mode is summarized in Table 1 below.

TABLE 1

ITC and OTC Keys in KEY Mode

| KEYS | | |
|---|---|---|
| ITC | OTG | ACTION |
| ON | ON | Incoming calls directed to the pilot number are enabled. Outgoing (outside) calls are enabled. When the handset is lifted, incoming calls will be handled before an outgoing origination is allowed. |
| ON | OFF | Incoming calls directed to the pilot number (key group calls) are enabled. Outgoing (outside) calls are disabled. |
| OFF | ON | Incoming (key group) calls are disabled. Outgoing (outside) calls are enabled. |
| OFF | OFF | Incoming (key group) calls are disabled. Outgoing (outside) calls are disabled. |

The ITC key disables and enables key group calls without affecting calls directed to the station.

When the OTG indicator is off, outgoing (station) calls are disabled.

To receive an incoming key call: If the station set is in key mode (the ITC and INC indicators are lit), the station user can receive incoming calls directed to a key group number and there is no affect on calls directed to the particular station. If the station set is in PBX mode (the ITC indicator is off), the station cannot receive incoming key group calls and there is no affect on calls directed to the users station.

The VOICE indicator will flash simultaneously with the ringing of the phone. Internal calls directed to the particular station ring that telephone with repeated single bursts of ringing, to distinguish incoming calls.

Outside calls directed to that station ring the telephone with repeated double burst of ringing. When in key mode and incoming calls are allowed, calls directed to a pre-defined key group number, encompassing all key group members, ring that telephone with repeated triple bursts of ringing. The call waiting indicator is lit only for key group calls and not for calls directed to the phone as an individual.

When the handset is lifted the call is answered (the VOICE indicator will be lit continuously and the call status information will be shown on the display). Ringing of specific phones in the group can be supressed, e.g. when a secretary is assigned to answer calls directed to the group, only the secretary's phone will ring.

To call another station (outgoing calls), if the station set is in key mode (i.e., the ITC indicator is lit), depress the ITC key (the ITC indicator light goes off) to activate PBX mode. Internal (local) calls within the PBX can also be made without going into PBX mode.

If the station set is in PBX mode (the ITC indicator is off) and the PBX mode is active, then lift the handset (the VOICE indicator will light), and listen for dial tone and dial the station number (the digits dialed will be shown on the display).

To call an outside number, if the station set is in key mode (the ITC indicator is lit): then (1) Depress the OTG key (OTG indicator is lit) indicating outgoing calls are enabled; (2) Lift the handset (VOICE indicator lit) and listen for dial tone. The phone will automatically route to an available trunk used for processing outgoing traffic (the outside access code will be shown on the display); and (3) Dial the outside number (the digits dialed will be shown on the display); and (4) Upon termination of a call, the OTG indicator may be automatically set to go off, if desired.

If the station set is in PBX mode (the ITC indicator is off), then (1) lift the handset (VOICE indicator lit) and listen for dial tone; and (2) dial the outside access code, wait for the second dial tone, and dial the listed telephone number (the digits dialed will be shown on the display).

To transfer a call, if the station is set is in key mode (the ITC indicator is lit), depress the ITC key (ITC indicator goes off). PBX mode is then enabled.

If the station set is in PBX mode (the ITC indicator is off), depress the RECALL/TAP key. Then, (1) The party is placed on hold (VOICE indicator flashes). A distinctive dial tone (a high tone followed by normal dial tone is heard); (2) The number of the station to which the party is being transferred is dialed (the digits dialed will be shown on the display); (3) Ringing is heard; (4) Upon hanging up, the party will be transferred to the ringing station; and (5) The line can remain connected so as to enable informing the party at the called station that of the transferring of the call. Upon hanging up, the transfer will be completed.

To place a call on hold, HOLD key is depressed. A single digit is disabled identifying the held call (the HOLD indicator will be lit). The call will be placed on hold. A single digit 0 through 9, * or #, may be selected enabling as many as 12 calls to be placed on hold at one time.

To pick up a held call, the HOLD key is depressed. The identifying single digit is dialed, which was used to hold the call. (The Hold indicator will go off). The party on hold will be returned to the line.

To carry on a private in-room conversation while conversing with a party, the MUTE key is depressed (MUTE indicator lit). The handset or speaker microphone will be muted, excluding the party on the station set from the in-room conversation.

The following features are obtained using the processes discussed below:

SAVE SPEED DIAL NUMBER

The following process will store the numbers in memory:
1. Depress the SAVE key.
2. Depress the SPEED DIAL key.
3. The alphanumeric display will prompt ENTRY # >.

4. Enter any two keys, 0 thru 9, (code given to the number being entered).

5. The alphanumeric display will prompt NN>.

6. Enter a number which is being saved. (If the number to be saved contains a *, enter #* in its place. If the number contains a #, enter ## in its place.

Example:

When DIALING a call pickup access code and station number, enter the following:

n (call pickup access code) nnn (station number)

When SAVING a call pickup access code and station number, enter the following:

n (call pickup access code) nnn (station number)

7. When needed, the speed dial number can contain any number of pauses, or waits, between the digits (for dialing into a common carrier, etc.). Enter #1 to insert a wait time where needed, which represents a pause of one to nine seconds, depending on what was assigned in the Save Wait Time Procedure.

8. Depress the SAVE key.

Up to 32 entries of a maximum of 45 digits of personal memory dialing will be stored.

Press "*" to delete a digit that has been entered.

9. To delete a saved speed dial number: depress the SAVE key, the SPEED DIAL key, and enter the two digits associated with the saved number (the saved number will be displayed). Depress the SAVE key (the number saved will be deleted from the memory).

10. To display a saved speed dial number: depress the SAVE key, the SPEED DIAL key, and enter the two digits associated with the saved number (the saved number will be displayed). Depress the SPEED DIAL key (the saved number will disappear from the display, while remaining in the memory).

SPEED DIAL KEY

The speed dialing feature may be accessed in PBX, key or data mode.

1. Lift the handset and listen for dial tone.
2. Depress the SPEED DIAL key.
3. Enter the two digits associated with the number that is to be dialed.
4. The associated number will display as it is dialed.

If speed dialing in key mode, depress the ACCESS key before lifting the handset to receive an outside line and dial tone.

SAVE WAIT TIME

To program the wait digit time duration:
1. Depress the SAVE key.
2. Enter # and 1 keys.
3. Enter one key, 1 thru 9 (number of seconds to wait).
4. Depress the SAVE key.

The number entered will determine the delay time in effect whenever a wait is specified in a Speed Dial Number. The default on the initial connection of the phone is one second.

STATUS LETTERS

The lower 16-character segment of the alphanumeric display monitors up to 16 selectable stations within the system. Each position will display a letter corresponding to the status of the station with which it is associated.

The stations chosen to be monitored must be within the system.

Standard displays include:
"B": Station is busy
"F": Station is forwarding its calls
"I": Station is idle
"L": Station is locked/disabled to incoming calls
"R": Station is ringing Station users with DTMF (tone dialing) phones can change the display character that will be shown on phones monitoring that particular station.

1. Dial the custom character definition access code.
2. To select one of the three characters displayed on the digit keys: Enter "*" to select the first of the three characters or Enter "0" to select the second character or Enter "#" to select the third character 3. Enter the appropriate digit key.
4. The status character display will be changed.

For example, to change monitored status character from an "I" (for idle) to a "V" (for vacation), select (#,8="V").

EXAMPLES

| Q,Z | A,B,C | D,E,F | 0,2 = "B" |
|---|---|---|---|
| 1 | 2 | 3 | |
| G,H,I | J,K,L | M,N,O | *,8 = "T" |
| 4 | 5 | 6 | |
| P,R,S | T,U,V | W,X,Y | #,1 = "Z" |
| 7 | 8 | 9 | |
| FUNCT. | FUNCT. | FUNCT. | |
| * | 0 | # | |

Uniform Call Distribution

An incoming call to the key group number is presented to the station through uniform call distribution (distributes the longest waiting call first). When multiple phones are used to process calls on the same group of incoming traffic, the incoming traffic is distributed by the longest waiting call being given to the first key phone to come offhook in key mode while the INC selector is active.

Bridging

To dial a busy station and break into the conversation:
1. Key mode is active (the ITCM indicator is lit).
2. Lift the handset; dial tone will not be present.
3. Dial a station number within the system, (dialing outside of the system (a trunk or C.O. line) will produce intercept tone).
4. A conference connection to the busy station will be made through the TDM switching system. The ability to bridge on is limited to a 3-way connection; additional key phones cannot bridge on.

CALLWTG (CW) Indicator

The CALLWTG indicator will be lit when an incoming call is directed to the key group number. The CALLWTG indicator will begin to flash at an increasing rate as the number of un-answered incoming calls increases.

Automatic Callback

Initiate Automatic Callback

To initiate automatic callback when the called station is busy:

1. Depress the RECALL key.

2. Listen for distinctive dial tone (a high tone followed by normal dial tone).
3. Dial the automatic callback access code.
4. Successful setup is indicated by three bursts of dial tone.
5. Hang up the phone and wait for ringing.
6. Answer the call and receive ringback tone. This indicates the ringing of the called station.
7. On answer connection is made to the called party.

Cancel Automatic Callback

To cancel automatic callback:
1. Dial the cancel automatic callback access code.
2. Successful cancellation of automatic callback is indicated by three bursts of dial tone.

Call Forwarding

To have all calls to the station forwarded to another station (or an attendant, pilot group number, key group number, speed dial entry, or trunk routing code):
1. Dial the call forwarding access code.
2. Dial the call forwarding condition code.
Possible condition codes are:
0=Forward no calls.
1=Forward all calls if the station is busy.
2=Forward all calls is the station does not answer.
3=Forward all calls if the station is busy or does not answer.
4=Forward all calls.
3. Dial the directory number of the station to which the calls will be forwarded.
4. Successful completion of call forwarding setup is indicated by three quick bursts of dial tone; unsuccessful completion is indicated by intercept tone.

A call will be forwarded only once. (That is, if the "forward to" destination also has all forwarding in effect, the forwarded call will not be forwarded a second time but will ring this second phone.)

Remote Call Forwarding

To have all calls to the station forwarded to the station where the user are currently located:
1. Dial the call forwarding access code.
2. Dial the remote call forwarding condition code.
Possible condition codes are:
5=Forward no calls.
6=Forward all calls if the station is busy.
7=Forward all calls is the station does not answer.
8=Forward all calls if the station is busy or does not answer.
9=Forward all calls.
3. Dial the directory number of the station from which calls will be forwarded.
4. Dial the enable code of the station from which calls will be forwarded.
5. Successful completion of remote call forwarding setup is indicated by three quick bursts of dial tone; unsuccessful completion is indicated by intercept tone.

Call Hold

Originating Call Hold
To place a call on hold:
1. While conversing with another party, depress the RECALL key.
2. Wait for distinctive dial tone (a high tone followed by normal dial tone).
3. Dial the call hold access code.
4. Dial a single digit identifying the held call.
5. Successful call hold is indicated by three bursts of dial tone.

A station with a held call may make or receive calls in the normal manner.

Retrieving a Held Call
To pick up a held call:
1. Dial the call hold access code.
2. Dial a single digit identifying the held call.

Automatic Ringback on Held Call

If a station hangs up while it has a call on consultation hold, the station will automatically ring and the holding party will be on the line.

Call Park

Originating Call Park
To park a call onto a station
1. While conversing with an outside party, depress the RECALL key.
2. The outside party is placed on hold and distinctive dial tone (a high tone followed by normal dial tone) is received.
3. Dial the call park access code plus the station number on which to park the call.
4. Successful call park is indicated by three bursts of dial tone.

A station with a parked call may make or receive calls in the normal manner.

Retrieving A Parked Call
To pick up a parked call:
1. Lift the handset and listen for dial tone.
2. Dial the pick up parked call access code plus the station number on which the call is parked.

If the parked call is not retrieved within a pre-defined time of twenty seconds, the station which parked the call will begin to ring.

Call Pickup

Group Call Pickup
To answer a call ringing which is in the call pickup group:
1. Lift the handset and listen for dial tone.
2. Dial the call pickup access code and answer the call.

Directed Call Pickup
To answer a call ringing at a specific station from any other station:
1. Lift the handset and listen for dial tone.
2. Dial the directed call pickup access code plus the station number of the ringing phone.
3. Wait for the call to come on the line.

Pilot Group Call Pickup
To answer a pilot call which is outside of the call pickup group:
1. Lift the handset and listen for dial tone.
2. Dial the directed call pickup access code plus the pilot number.
3. Wait for the call to come on the line.

Call Waiting

Originating Call Waiting
To signal a called party which is busy:
1. The called station is busy.
2. Depress the RECALL key.
3. Wait for distinctive dial tone (a high tone followed by normal dial tone).
4. Dial the call waiting originating access code.

5. Successful activation will be indicated by ringback tone.

6. Remain offhook until the called station answers.

Call Waiting Signal/Retrieving Call Waiting

While you are conversing with another party:

1. Call waiting tone is heard in your handset.

2. If you wish, terminate the conversation and hang up.

3. The station will ring.

4. Or, depress the RECALL key (the original call is placed on hold).

5. Wait for distinctive dial tone (a high tone followed by normal dial tone).

6. Dial the pickup call waiting access code.

7. The waiting call is connected to the station.

8. Return to the held party is obtained by depressing the RECALL key, waiting for distinctive dial tone and then dialing the drop-third-party command code "4". This re-establishes the original call.

Call Waiting Class of Service

Any call to a busy station with the Call Waiting Terminating class of service will automatically receive call waiting originating treatment. (The calling party will receive ringback tone and the called party will receive call waiting tone.)

Conference Calls

To set up a three-way conference with another station or outside party after a two-way call has been initiated:

1. Inform the party with whom you are speaking that you wish to include a third party in a conference call.

2. Depress the RECALL key. (Party is placed on hold.)

3. Wait for distinctive dial tone (a high tone followed by normal dial tone).

4. Dial the station number or trunk access code and outside number. (In case of misdial or no answer, depress the RECALL key to return to the held party. If the number dialed is busy, depress the RECALL key twice to return to the held party.)

5. Announce the call.

6. Depress the RECALL key. (Third party is placed on hold.)

7. Wait for distinctive dial tone (a low tone followed by normal dial tone).

8. Dial the add-party command code "3".

9. A three-way conference is initiated. (You will hear a burst of tone when the new party enters.)

10. Once the conference is initiated, one more party can be added by following the appropriate procedures outlined in the following "Progressive Conference" section.

A conference containing from five to eight parties can also be set up from a two-way call by dialing the command code "8" to add the parties. If the system permits, a conference call can be set up with as many as sixteen parties by dialing command code "9".

To initiate a progressive conference containing up to eight parties from an idle station:

1. Dial the progressive conference access code.

2. Wait for distinctive dial tone (a high tone followed by normal dial tone).

3. Dial the station number of the first conferee.

4. Announce conference.

5. Depress the RECALL key. (First conferee is placed on hold.)

6. Wait for distinctive dial tone (a low tone followed by normal dial tone).

7. Dial the add-party command code "3". (You and conferee are now on the conference line. Conferees already on the conference line will hear one burst of tone when another conferee enters the conference line.)

To include each additional conferee:

1. Depress the RECALL key. (The conference line is placed on hold.)

2. Wait for distinctive dial tone (a high tone followed by normal dial tone).

3. Dial the station number or trunk access code and outside number.

4. Announce the conference.

5. Depress the RECALL key. (The next conferee is placed on hold.)

6. Wait for distinctive dial tone (a low tone followed by normal dial tone).

7. Dial the add-party command code "3". (You and conferee are now on the conference line. Conferees already on the conference line will hear one burst of tone when another conferee enters the conference line.)

Consultation With Shuttle

To initiate consultation with shuttle between a second and third party (either party being an outside party or another station):

1. Inform the party with whom you are speaking that you are placing him on hold.

2. Depress the RECALL key. (The second party is placed on hold.)

3. Wait for distinctive dial tone (a high tone followed by normal dial tone).

4. Dial the station number or trunk access code and outside number. (In case of misdial or no answer, depress the RECALL key to return to the held party. If the number dialed is busy, depress the RECALL key twice to return to the held party.)

5. Consult privately.

6. Inform the party with whom you are consulting that you placing him on hold.

7. Depress the RECALL key. (The third party is placed on hold.)

8. Wait for distinctive dial tone (a low tone followed by normal dial tone).

9. To return to the original call, dial the shuttle command code "2".

10. To shuttle between the two parties, depress the RECALL key. (As one party is connected, the other is placed on hold.)

11. If you hang up at any point after the shuttle is initiated, the second and third parties will be connected.

One-Time Consultation

For one-time consultation with an outside party or another station during a call:

1. Inform the party with whom you are speaking that you are placing him on hold.

2. Depress the RECALL key. (Party is placed on hold.)

3. Wait for distinctive dial tone (a high tone followed by normal dial tone).

4. Dial the station number or trunk access code and outside number. (In case of misdial or no answer, depress the RECALL key to return to the held party. If the number dialed is busy, depress the RECALL key twice to return to the held party.)

5. Consult privately.

6. After you have finished consulting, depress the RECALL key.

7. Wait for distinctive dial tone (a low tone followed by normal dial tone).

8. Dial the drop-third-party command code "4".

9. The original call is re-established.

Last Number Called Redial

If you place a call and find:
the number is busy,
the called party does not answer, or
if you wish to continue the call at a later time.
Providing you have not dialed another number since your last call, you can automatically redial the number.

1. Lift the handset and listen for dial tone.

2. Dial the last number called redial access code and the system will automatically redial the last number called.

Last Number Saved Redial

If you place a call and find:
the number is busy,
the called party does not answer, or
if you wish to continue the call at a later time.
You may store the dialed number for later use.

1. Depress the RECALL key.

2. Receive distinctive dial tone (a high tone followed by normal dial tone).

3. Dial the save last number access code.

4. To redial the saved number, dial the last number saved redial access code and the system will automatically redial the stored number.

Priority Override

To allow calls via priority override:

1. Administratively assign the class of service to allow priority calls from each desired station.

2. When making a priority call, dial the priority access code, then dial the station number.

RECALL Key

The RECALL key is a dual purpose key which provides a hookflash operation for recall of a party, and distinctive dial tone for access to PBX features.

To recall a party in the process of being transferred (PBX mode is active, the ITC indicator is off):

If the station to which you are transferring to does not answer:

1. Depress the RECALL key, the original party will be returned to you.

or if the station to which you are transferring to is busy:

1. Depress the RECALL key twice, your original party will be returned.

To receive distinctive dial tone for access to PBX features (PBX mode is active, the ITC indicator is off):

1. Depress the RECALL key and receive distinctive dial tone (a high tone followed by normal dial tone).

2. The station set is now ready to accept a PBX call handling command.

System Speed Dialing

Frequently called business numbers are stored in the system as abbreviated codes. To place a system speed call:

1. Lift the handset and listen for dial tone.

2. Dial the system speed dial access code plus the appropriate code number.

DATE MODE

Terminals or personal computers can be connected to other personal computers, terminals or a mainframe computer by a key-phone 10 on each end of the connection, permitting data communications. At the same time, voice communication is permissible, allowing for integrated voice/data capability.

The data channel is independent from the voice channel. While actively on the data channel, the use of any station set keys aside from the DATA key, the SPEED DIAL key, and the keypad are ineffective. The upper segment of the alphanumeric display will not be shown while actively on the data channel. To activate call handling operations it is necessary to return to the voice channel.

Incoming Calls

To answer an incoming data call:

1. The data channel will ring (the DATA indicator will flash at a ringing rate). The ringing of an incoming data channel call has a distinctive cadence from ringing on the voice channel.

2. Depress the DATA key.

3. Lift the handset (the DATA indicator will be lit continuously).

4. Talk if required.

5. The calling party will depress the DATA key to establish a data connection and receive a tone indicating a ready connection.

6. Depress the DATA key (the DATA and VOICE indicator will be lit continuously).

7. Replace the handset (the DATA indicator will be on and the VOICE indicator will go off.)

8. The phone is in data mode for data transmission.

If both the voice and data channels are ringing simultaneously, the voice call will be answered when the phone comes off-hook. The data channel will continue to ring. To answer the data call, depress the DATA key. (When the data channel is in auto-answer/auto-drop mode, the data call will be answered automatically.)

Auto-Answer/Auto-Drop Mode

When the station set is in the auto-answer/auto-drop mode, a data transmission call will be automatically accepted and completed. To successfully transfer data, the incoming data characteristics must match those which the receiving station set is preset to accept. The auto-answer/auto-drop mode will cause the station set to automatically drop an invalid data call within eight seconds.

To set the station set to auto-answer/auto-drop mode:

1. Place the data characteristic selection switch, (located on the bottom of the station set) in the closed position.

2. Data calls will be automatically received and completed.

Outgoing Calls

To make an outgoing data call:

1. Depress the DATA key (the DATA indicator will flash).

2. Lift the handset and listen for dial tone (the DATA indicator will be lit continuously).

3. Dial the data number and receive ring back tone. (If you receive a high pitched tone, this indicates the terminating end is in auto-answer/auto-drop mode.)

4. Talk if required.

5. Depress the DATA key (the DATA and VOICE indicator will be lit continuously).

6. Replace the handset (the DATA indicator will be on and the VOICE indicator will go off.

7. The phone is in data mode for data transmission.

Terminating a Data Call

To terminate a data call while data is being transmitted:

1. Depress the DATA key (the DATA indicator will flash).

2. Lift the handset momentarily, then replace the handset, terminating the connection (the DATA indicator will go off).

Simultaneous Voice and Data Calls

Simultaneous voice and data transmission to the same connection or to separate connections is permitted. The maximum rate of data transfer of a simultaneous connection is 9600 baud.

Higher rates of data transfer of up to 64 K baud are possible; however, transmitting at this rate disables simultaneous calls, as all bandwidth is utilized by the data channel. If the voice channel rings and the phone is answered, the voice channel is enabled and the 64 K synchronous data channel is disabled. Upon going back on-hook, the data transmission is resumed.

Simultaneous voice and data channel, incoming: 1. A voice connection is established (the VOICE indicator is lit).

2. Receive an unrelated incoming data call or make arrangements for an incoming data call forms the party already present on the voice channel.

3. The data channel will ring (the DATA indicator will flash).

4. Depress the DATA key.

5. The voice channel is on hold (the VOICE indicator will flash and the DATA indicator is lit continuously).

6. Talk on the data channel if required.

7. Depress the DATA key (the DATA indicator is lit continuously). The phone is in data mode for data transmission.

8. The phone has now returned to the voice channel (the VOICE indicator is lit continuously).

9. A conversation is now present on the voice channel at the same time as data transmission is taking place on the data channel.

To receive an incoming call on the voice channel if a conversation is taking place on the data channel; complete the conversation, depress the DATA key (data transmission is now active) and answer the voice channel.

Simultaneous voice and data channel, outgoing:

1. A voice connection is established (the VOICE indicator is lit).

2. Depress the DATA key.

3. The voice channel is on hold (the VOICE indicator will flash and the DATA indicator is lit continuously).

4. Receive the dial tone, dial the data number and receive ringback tone. (If you receive a high-pitched tone, this means the terminating end is in auto-answer-/auto-drop mode.)

5. Talk on the data channel if required.

6. Depress the DATA key (the DATA and VOICE indicators are lit continuously).

7. The phone is on the voice channel.

8. A conversation is now present on the voice channel at the same time as data transmission is taking place on the data channel.

Terminating Simultaneous Voice and Data Calls

To terminate a DATA call with both channels busy:

1. A conversation is currently active on the voice channel (the station number will be shown on the display), while data transmission is being processed (the DATA and VOICE indicators are lit continuously).

2. Depress the DATA key; the data channel becomes the current active channel.

3. The voice channel will be placed on hold (the VOICE indicator will flash).

4. Replace the handset, disconnecting the data channel (the DATA indicator will go off).

5. To retrieve the voice call on hold, simply lift the handset (the VOICE indicator is lit continuously).

To terminate a VOICE call with both channels busy:

1. A conversation is currently active on the voice channel, while data transmission is being processed (the DATA and VOICE indicators are lit continuously).

2. Replace the handset, disconnecting the voice channel (the VOICE indicator will go off).

Figure 2:
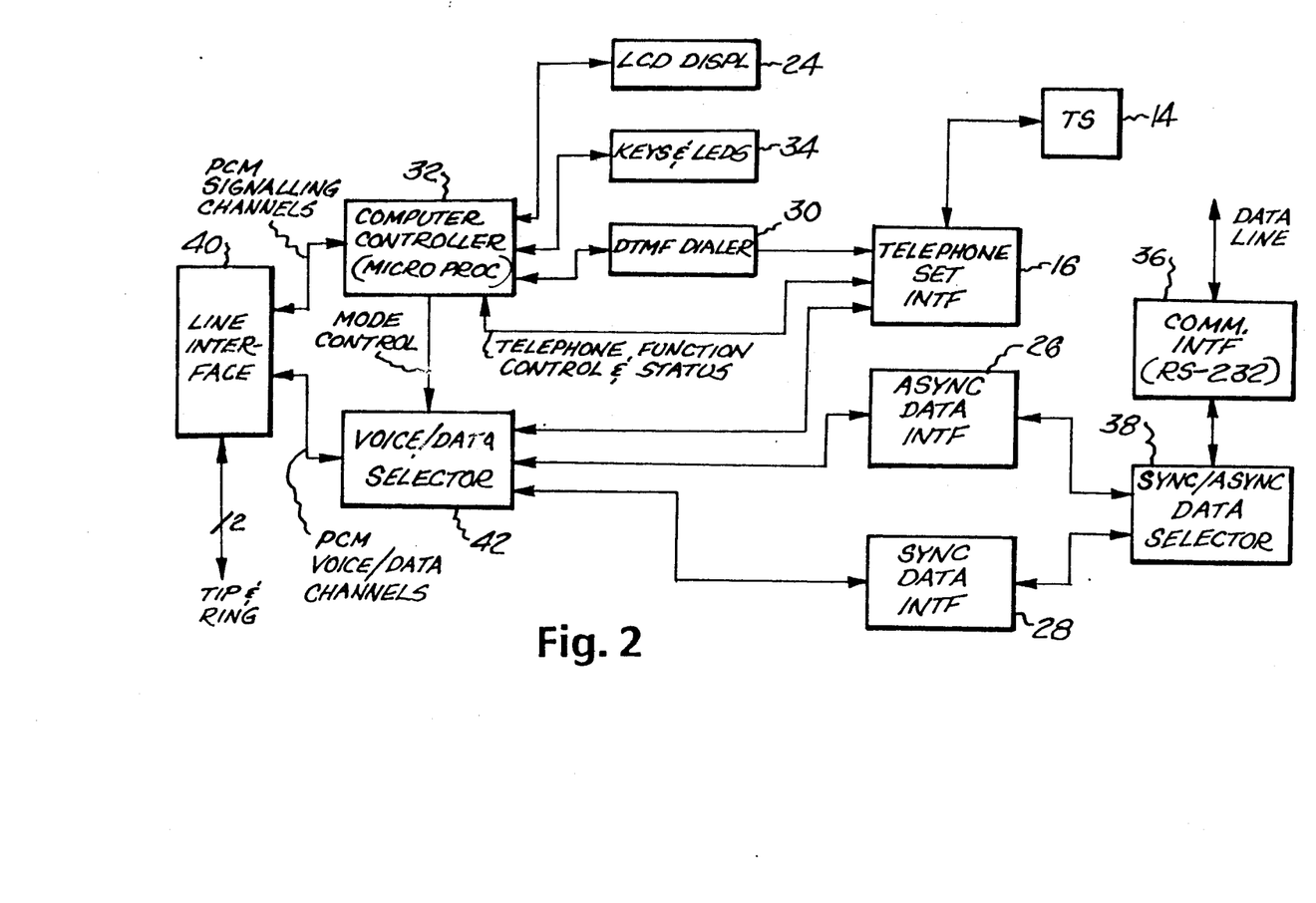
FIG. 2 is a block diagram of the circuitry included in the key phone station set.

Referring to FIG. 2 the telephone set TS includes the transmitter and receiver of the handset 14 and its hook switch. It may also include the speaker 22 which is enabled by a switch in the telephone set when the monitor (MON) button is depressed. Power is supplied to the transmitter of the handset, as is side tone, from the telephone set interface 16. This telephone interface includes codecs for analog to digital and digital to analog conversion. The keypad operates a dual tone multi-frequency (DTMF) dialer 30 so that analog DTMF information as to dial digits can be converted into PCM codes by the telephone set interface codecs. The codecs are responsive to the switching commands so as to provide, for example A law or mu law companding. There are also attenuating pads in the interface 16, which are switched in under microprocessor control to provide equal loss on trunk and internal (local) calls. Ringing actuating signals to the interface 16 enable the ringer in the key phone. The interface 16 also provides access to the hook switch.

The ringing and hook switch access are telephone functions which are communicated from the interface 16 to a computer controller (e.g. a microprocessor 32). The microprocessor 32 is contained in the station set 10.

The keys status and the LED's (visual indicators) are represented by the block 34. The status lines from the keys are connected to the microprocessor 32 and the LED operating power is applied from the microprocessor 32. The LCD display 24 is also driven, through a suitable display driver from the computer controller microprocessor 32.

The data line, which may be connected to a computer or other source of data through a communications interface, such as a conventional RS-232 interface 36, is connected to a synchronous/asynchronous (async) data selector 38. A synchronous data is data which is transmitted at a slower baud rate (8 Kbps in the system described herein). The synchronous data is transmitted at a more rapid rate, 64 Kbps when the switch which was mentioned in connection with FIG. 1, located at the bottom of the housing 10, selects synchronous data. Asynchronous data may be transmitted with voice on the PCM channel. When synchronous data is selected the system is switched into the data mode and the entire PCM channel (8 bits) is used for data.

The data passes through the asynchronous data interface 26 and the synchronous data interface 28 depending upon whether synchronous or asynchronous data is selected by the selector 38. These data interfaces may be data set interfaces, type MC145428 which are available from Motorola, Semiconductor Products, Inc., 3501 Ed Bluestein Blvd., Austin, Texas 78721, USA. Further information about the data set interface device and about other devices, known as universal digital loop transceivers (ULDT) types MC145422 which is used in the line interface 50 of the line circuit (FIG. 3) and MC145426 which is used in the line interface 40 of the station set shown in this FIG. 2 will be found in a text entitled "Motorola Telecommunications Device Data" which is prepared by the Motorola Technical Information Center, copyright 1985 by Motorola, Inc.

The line interface 40 and the computer controller provide signalling data channels for data as to the status of the function keys and also of the DTMF dialer keys as well as the telephone function status (e.g. hookswitch condition). The channels are bidirectional and also operate the display 24, the indicator LEDs 34, and provide function control for the ringer, tone generators and pads in the telephone set interface 16.

PCM voice/data channels extend from the telephone set interface 16 and the asynchronous and synchronous data interfaces 26 and 28 through a voice data selector 42 to the line interface 40. The voice data selector 42 switches the data and voice PCM bits when the data mode is selected so as to enable dialing out with the DTMF dialer on the data channel when the voice channel is not used. The mode control line from the processor 32 interchanges the voice and data channels and allows seven bit DTMF PCM data to be transmitted on the data channel instead of on the voice channels. A signalling message is then transmitted to the mode control line to reverse the time slots allocated to voice and data codes so as to retrieve the dialed digits for setting up connections through the switching system with the dialed codes which are transmitted along the data channel. The voice data control 42 also, on receiving the 8 bit combined voice and data codes, strips the 7 bits allocated to the voice code and the 1 bit allocated to the data which is then supplied to the asynchronous data interface 26. In the event that synchronous data is received at the 64 Kbps rate the entire 8 bits are switched to the synchronous data interface 28.

The interfaces format the received 1 bit data codes into a data bit stream compatible with the RS-232 protocol or other protocol provided by the communications interface 36. For example, the 8 kilobit rate is converted into a 9.6 kilobit standard rate or to slower baud rates as established by the selector switch which may be located at the base of the station set 10 which can operate at other baud rates; e.g. 300, 1200, 2400 and 4800 baud, as well as 9600 baud. On transmit, the voice data selector 42 combines the 8 and 56 Kbps PCM codes to provide 64 Kbps PCM codes consisting of voice bits and a data bit. A shift register in the voice data selector is provided to combine the data and voice bits at the PCM clock rate in response to clock signals from the line interface 40.

The microprocessor controller 32 provides two 8 kilobit per second signalling channels, each consisting of a single bit, which are transmitted as a multibit message by the line interface 40. Each message consists of the ten bits in this illustrative embodiment. These are in the format $S_1$, $S_2$, $V_0$, $V_1$, $V_2$, $V_3$, $V_4$, $V_5$, $V_6$, $V_7$, and $D_1$. These ten bit messages are transmitted and received by the line interface 40 at an 80 kilobit per second rate over two wires which provide the tip and ring leads. These two wires are in a cable shown at 44 in FIG. 1 and connect the station set to a line circuit at the input of a line interface 50. The line interface may be provided by a master MC145422 ULDT integrated circuit which is available from Motorola, Inc. and is described in the test referenced above.

It will be appreciated that the BAUD rate is faster than 80 Kbps. The BAUD rate provided by the integrated circuits of the line interfaces 40 and 50 is 256 Kbps, but only part of the capacity is used for transmitting the messages back and forth between the station sets and the line circuit. Noninterferring messages are sent from the master line interface 50 to the line interface 40 which, when it receives its message can respond by transmitting a message to the line circuit interface 50. Each ten bit message contains both the signalling bits and the voice and data bits. The signalling bits are chained into messages for controlling the telephone functions and the displays in the computer controller 32 of the station set. The form of the chains are into eight bit bytes of the general format NNNNXXXX. the N bits are system commands which identify the action to be taken, for example if NNNN is a number corresponding to decimal 1 the system command effects a particular visual indicator, for example the LED over the INC key. Then if the X bits equal decimal 1 the command will be to turn the LED on. If the X bits equal decimal 2 the command will be to turn the LED off. Other decimal values can vary the flash rate. In order to operate the display multiple 8 bit characters are needed. Then if the N bits equal A in hexadecimal the X bits then represent how many characters are upcoming. Each of the next bytes for these characters has certain bits representing the position of the character on the line of the display 24 while the rest of the bits represent the symbol whether a letter or a numeral.

In transmitting messages as to key status the computer controller 32 in the station set 10 assembles the successive $S_2$ bits into 8 bit bytes in the form BSDDDDDD, where B is the sense of the button (up or down) and the S and D bits indicate which button or key is either up or down as represented by the B bit. The D bits map into a field which is decoded by table look up in the line circuit computer 54 (FIG. 3).

Figure 3:
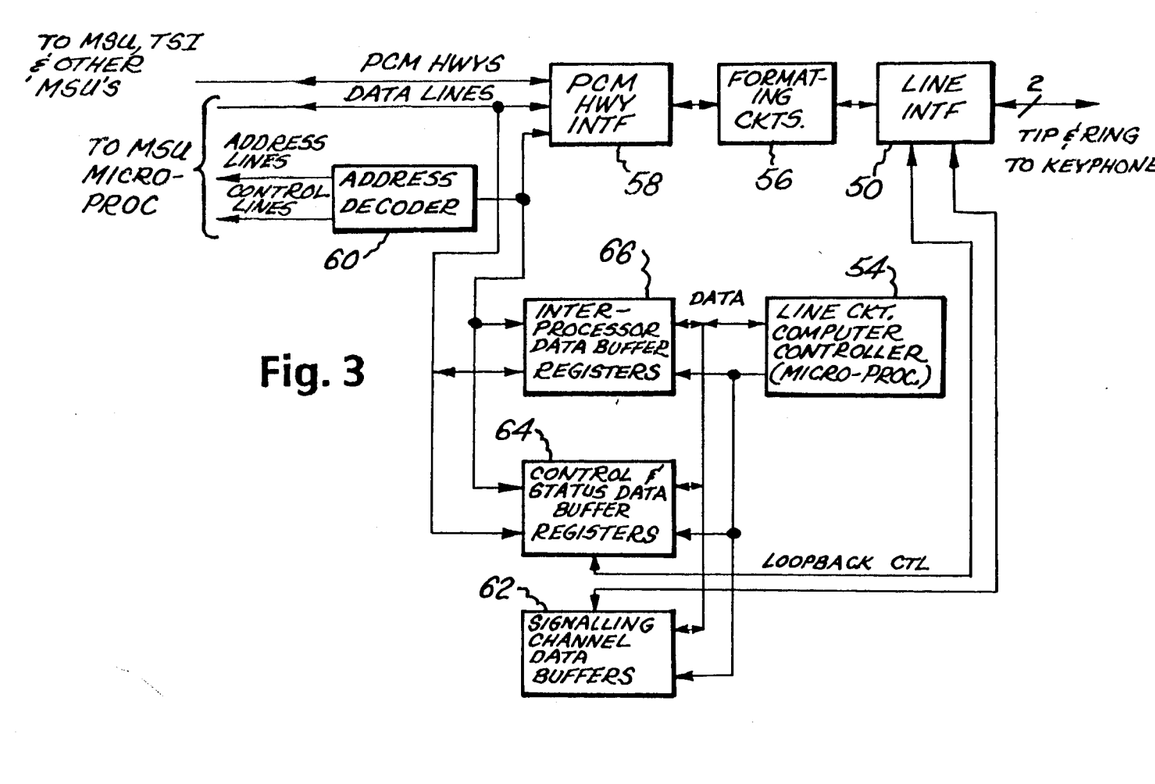
FIG. 3 is a block diagram of the line circuit showing connection to the processor of the TDM switching system.

Referring to FIG. 3 more specifically, the line interface 50 connects the voice and data channels represented by the PCM codes of the multibit messages to formatting circuits 56. These circuits may also contain voice data selectors for reversing the voice and data channels when the data channel is used for dial up. The formatting circuits convert the PCM data into bit streams compatible with the PCM highways of the switching system. In the event that more than one station set is associated with the line circuit, the line interface 50 and the formatting circuits 56 are duplicated for each station set. Time slots are allocated to each station set. There will be one time slot for voice data and another for digital data, such that for two line circuits four time slots are used. A PCM highway interface 58 connects the PCM codes after reformatting to the PCM highways of the switching system in accordance with addresses from the switching system which identify and allocate the time slots.

The switching system used with the key telephone system in accordance with this illustrative embodiment of the invention is preferably the modular switching system (MSS) including individual modular switching units which supply the PCM highways, data lines, address lines and control lines. The PCM highways are internal highways to the individual modular switching units which may be connected by inter MSU highways to other modular switching units. The modular switching units and the modular switching system is a time division switching system and is described in detail in U.S. Pat. No. 4,228,536, issued Oct. 14, 1980 in the name of K. Gueldenpfennig and C. J. Breidenstein, and U.S. Pat. No. 4,229,816, issued Oct. 21, 1980 in the names of C. J. Breidenstein, J. S. Caplan; and B. G. Littlefield.

Each line circuit has an address decoder 60 which checks if the time slot for the station set is coming up in accordance with the codes which are transmitted along the address lines (Grey) codes being used as described in the Gueldenpfennig et al patent. The allocation of time slots alternate PCM and data time slots. It will be appreciated that only seven bits are used for voice PCM and one bit is used in the data mode in each time slot thereby losing one of the eight bits and seven of the other eight bits in each of the time slots. The use of only one bit per time slot in the asynchronous data mode reduces the data rate to 8 Kbps unless the synchronous data mode is used.

The data lines from the computer controller or processor of the MSS are used to provide the signalling channels and the signalling bits S1 and S2 which are transmitted by the line interface 50 across the two wire lead to the key phone 10. Also the signalling channels (the S1 and S2 bits) are compiled into data bytes and transmitted to the MSS processor. The signalling channels are controlled by the line circuit computer controller 54 and extend through signalling channel data buffers 62, control status data buffers 64 and interprocessor data buffers 66. These buffers contain registers which handle the be assembled eight signalling bytes. There are two channels for the S1 and S2 signalling bits and the bytes made up of these bits. The S2 bits, which control the key functions and the display, are assembled and buffered in the signalling channel data buffer 62. The station status buffers assemble the S1 bits for ringing, pad switching etc. The signalling and control status bits are stored in the interprocessor buffers 66 and are transferred when the MSS processor addresses the particular line circuit via the address decoder 60.

For example during any time slot, different addresses may be used so as to transfer data to the buffers 64 or 66. A ringing indication may be written through the data bus as a ring command and registered in the buffers 64. The ring command is then transferred via the S1 bits through the line interface 50 so as to control the telephone set interface 16 (FIG. 2) to ring the line of the Key phone 10. In other words, the address determines which register, 64 or 66 will be talked to. When the address matches the address for the registers, the data from the data lines are latched in the designated register. Most message data which affects the S2 channel is addressed to the interprocessor buffer register 66.

A connection is shown from the data lines to the PCM highway interface 58 so that data for initialization upon power up which allocates time slots to the line circuit can then be transferred.

Provision is made for a loop back control between the line interface and the buffers 64 for transmitting special test programs via the buffers 64 and the line interface for testing the system.

Figure 4:
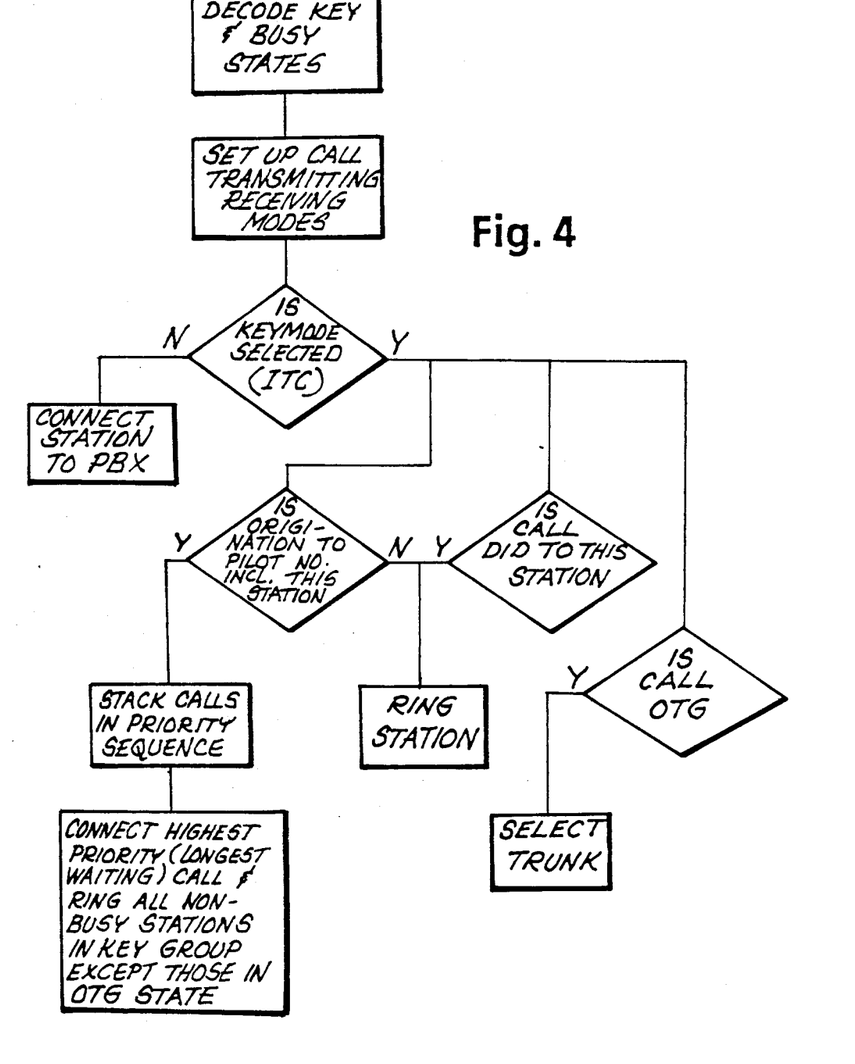
FIG. 4 is a flowchart illustrating the operation of the system in key and PBX mode.

It will become more apparent from FIG. 4 how the key or PBX modes are selected and particularly how multiple key calls to the same key group (the same pilot number) are distributed, as by the longest waiting call being given to the first key phone to come off hook in key mode while its INC key is selected (active).

The system is first operative to decode the key status and busy states of the station and to set up the call transmitting and receiving modes as indicated in Table 1 above. If the key mode is not selected the station is connected to the PBX, i.e. the phone operates as a standard line to the PBX switching system. If key mode is selected and the call is an outgoing call (OTG) with the OTG button depressed a trunk is automatically selected without going through the PBX mode and outside dial tone is heard. For incoming calls if the call is to this station the system operates to ring the station so that a connection can be made. If the originating call is to the pilot number which includes this station the calls are stacked in priority sequence.

An arbitration process is used in the MSS process. When a new key call is originated, the arbitration process enqueues the call for first in first out behavior and sends a message through the line circuit (FIG. 3) and through the signalling channel of the key phone as shown in FIG. 2 to the LED's 34 to cause activation of the call waiting LED. If the ringing is not muted, the key phone will ring. The first key phone in the group to answer deletes the call from the queue and changes the call waiting indication.

Messages are transmitted to the arbitration process by the station set. A message that a phone is available for a connection causes an arbitration reaction which informs the longest waiting call of the available party and removes the call from the queue. The messages to the key phone, which extend over the data line from the arbitration process in the MSS, provide ringing and illumination/flashing at a rate determined by the number of waiting calls of the call waiting LED. The messages originating at the station set are transmitted to the MSS to the calling line so as to begin the connection protocol. This protocol makes the connection through the MSS and particularly via the time slot interchanges (TSI) thereof. The notice of an available key phone would be inhibited if the OTG key were selected alone. An INC key must be selected in order to enable the generation and transmission of the available for connection message to the arbitration process of the MSU.

Figure 5A:
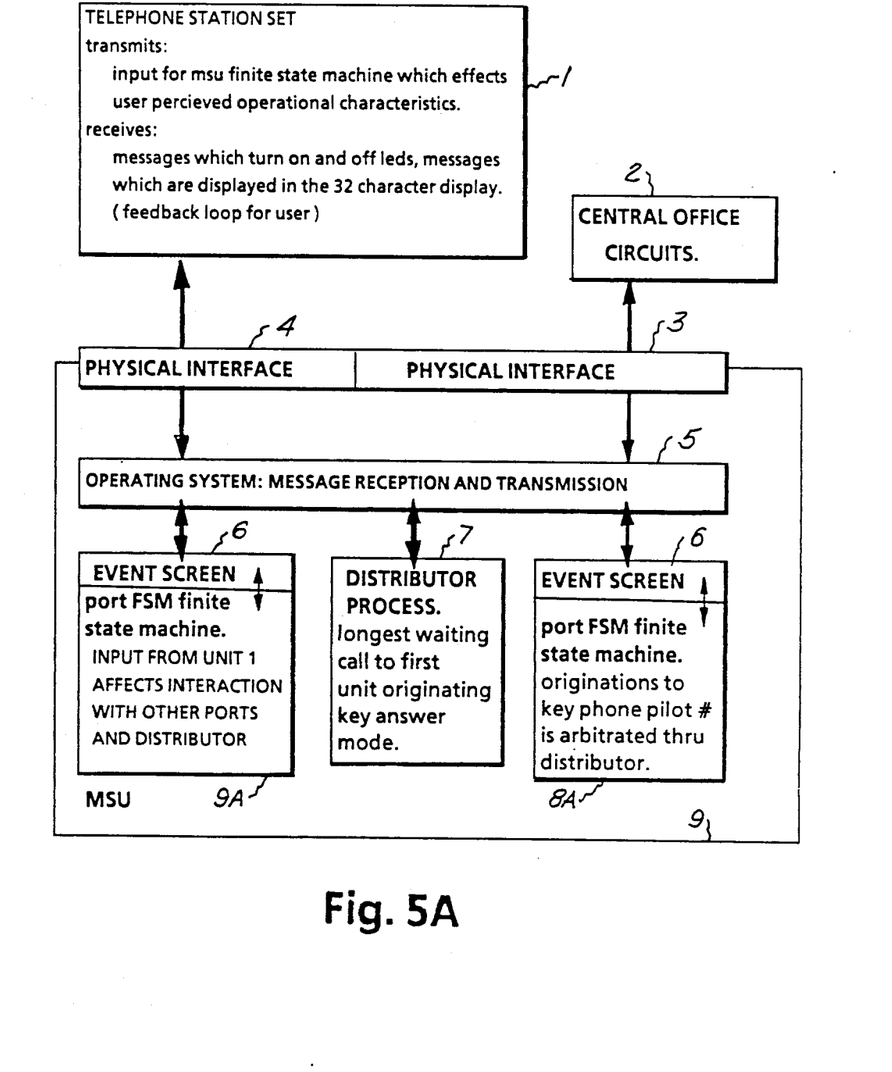
FIG. 5A, B & C are diagrams further explaining the operation of the key telephone system shown in the preceding FIGS.
Figure 5B:
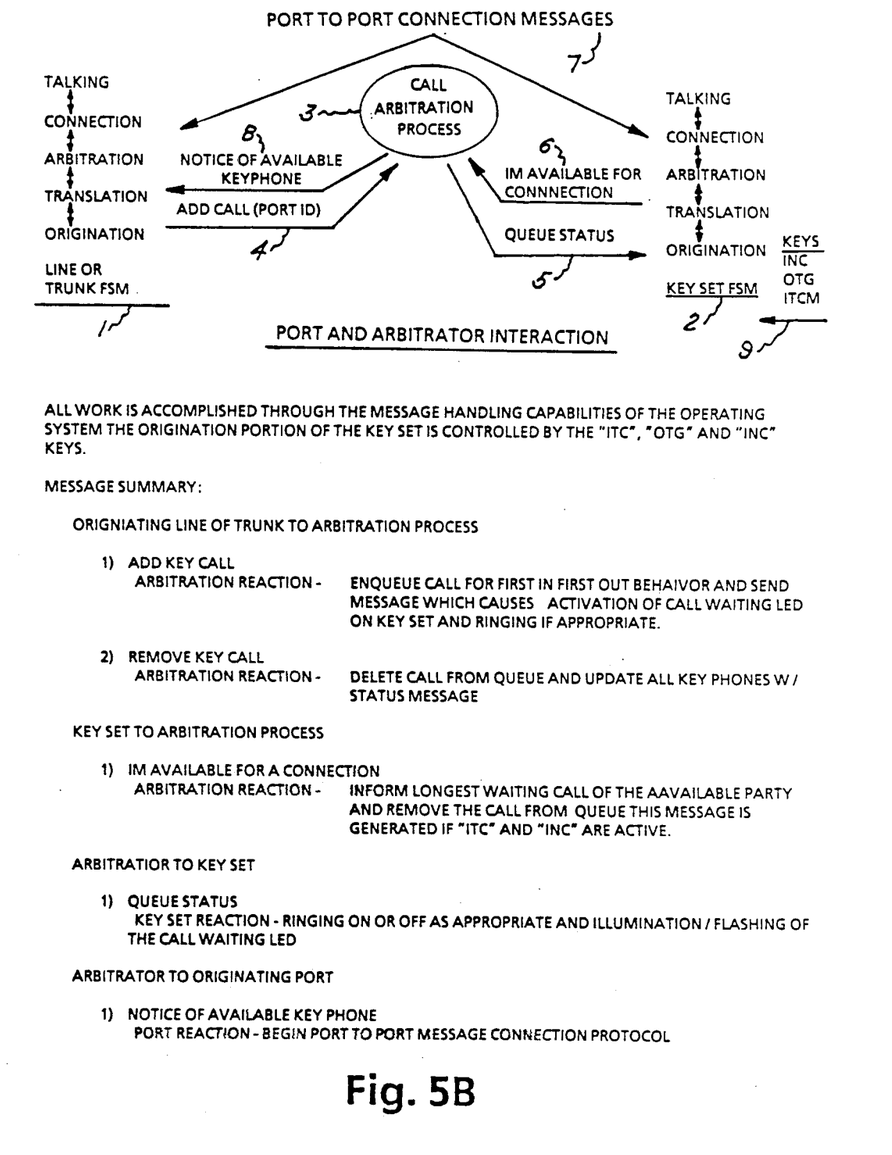
Figure 5C:
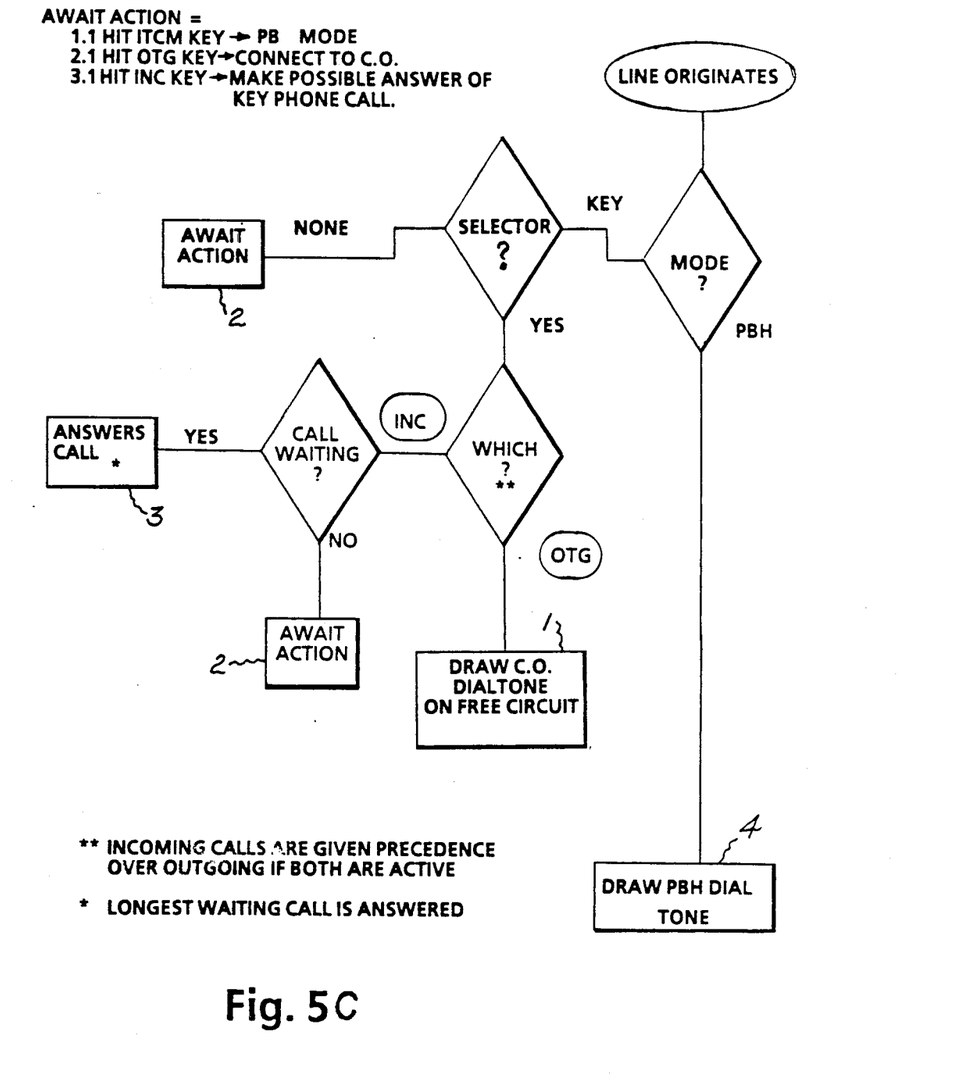

Referring to FIGS. 5A-C, the hybrid behavior of the set system (key/PBX modes) is woven into the origination transition as depicted in FIG. 5C and of the 4 events depicted in FIG. 5B representing termination attempts by the arbitrator at the behest of the circuit which has dialed the key group pilot number. The unique termination event allows key phone terminations to be distinguished from internal PBX/intercom type terminations. FIG. 5A summarizes all system components.

These figures show how key per circuit representations of a traditional 1A2 key system operation have been overcome with an added benefit. Origination and termination status of each station set is preserved between calls, allowing for anticipation of primary station usage with minimal keystroke operation.

Represented in FIG. 5A are the physical entities: the line circuit interface 4 (shown in detail in FIG. 2); the station set 1 (shown in detail in FIG. 1), trunk interface card 3 (shown in detail in FIG. 3) to the central office 2 and the MSU (Modular Switching Unit) 9 of the above referenced Gueldenpfenning Pat. U. S. Pat. No. 4,228,536. Each port or interface circuit is a Finite State Machine (FSM) process 8A, 9A. Other processes exist in the MSU 9 for maintenance, diagnostic and scheduling purposes 7. Ports and jobs communicate to one another via the message handling properties of the operating system 5 and each job and FSM has a unique "mailbox" for message delivery by the operating system 5. The scheduling properties of the operating system then allow each process/FSM to read and react to the "mail." The FSM representing the station sets 1 receives in addition to hookswitch supervision status detected by interrupt service routines of the operating system 5, the status of various keys of the station set. It is the interaction and synergy of the line FSM 9A, trunk FSM 8A and distributor process 7, and user's ability to orchestrate the line FSM 9A via "ITC", "OTG" and "INC" keys that allows the user to exercise the PBX or hybrid key phone options. Each port FSM and other processes have data structures/variables used for tracking call scenario progression. Some events are independent of state (displays) and are handled by state independent screen handlers 6, i.e. with no immediate response.

FIG. 5B shows the messages and processes involved in accomplishing key mode termination behavior. A line or trunk originates, dials and translates input with the realization that the number dialed is associated with a Pilot Group. The reaction is to advance state to an arbitration condition, awaiting connection while listening to ring back tone. During this state advancement routine, a message 4 is delivered to the arbitration process 3 which reacts by queueing the circuit ID for future distribution on an equitable basis. In addition, the add call message 4 included the pilot number group's identity which allows the distributor process 3 to look up in the data base all members and alert all members via the queue status message 5. The queue status message will cause all key phones to exhibit ringing behavior if idle and notifies all phones of call waiting depth so appropriate user alerting can be made via I/O drivers to all ports call waiting LED.

All station sets are now alerted by the CWTG LED and possibly ringing. If conditions are proper message (see FIG. 5C) merely coming offhook without pressing any keys will send an available connection message to the longest waiting arbitration process 3. The arbitrator forwards the ID of the key phone to the waiting circuit 1 and some quite ordinary path establishment protocol 7 follows.

Following the handoff of the call by the arbitrator, the arbitrator sends all group members a queue status message 5. Members activate/deactivate ringing and call waiting indicators as appropriate, i.e. if this were the only call, ringing would cease at all other members and CWTG LED would be out.

It can be appreciated from this description how the arbitrator stacks traffic and can reduce the need for keys at the station set for answering incoming key pilot number calls. A call waiting indicator has been substituted for a traditional 1A2 flashing key representing each C.O. circuit. It is merely a matter then of specifying to the FSM of the station set unit 1 that key mode "incoming behavior" is desired to effectively answer calls. Processing the call will have no affect on the on/off states of the INC and ITC key. Each origination will activate the same paths, allowing each user station set to minimize keystrokes in anticipation of primary calling usage.

FIG. 5B shows the origination transition of a circuit. Questions asked are related to the user's activiation/deactivation of ITC, INC, and OTG keys.

The output, answers call 3, is described previously in FIG. 5B, the await action output 2, represents a state where activation of the INC, OTG or ITC key is awaited. Upon activation, the questions depicted are reprocessed. In the draw C.O. dialtone 1 process, the OTG key has hunted a free C.O. circuit in a manner transparent to the user, utilizing code, as if the user had taken path 4 and then manually dialed the access code "9".

Thus, many keys are reduced to one for key phone originations if the OTG key is active and key mode is selected.

As previously mentioned, the OTG mode is preserved across calls allowing the user to minimize/eliminate keystrokes in anticipation of primary station usage, i.e. acceptance or original of calls.

From the foregoing description it will be apparent that there has been provided an improved key telephone system which is selectively operable in either key or PBX modes so that the most advantageous mode (key or PBX) may be selected by the user. The key mode minimizes the number of keys or buttons necessary to terminate or originate central office calls to the key station unit and provides selective access to outgoing lines and to incoming calls. While a preferred embodiment of the invention has been described, variations and modifications thereof within the scope of the invention will undoubtedly suggest themselves to those skilled in the art. Accordingly the foregoing description should be taken as illustrative and not in a limiting sense.

What is claimed is:

1. A key telephone system which includes telephone station sets connected to a time division digital electronic switching system which handles information in the form of PCM codes having a processor controller for making connections between lines including internal lines connected to said station sets and outside trunk lines, which system provides both key and private branch exchange (PBX) modes of operation, said system comprising a plurality of keys on each of said station sets including a key (ITC) for selecting between said key and PBX modes, a key (OTG) for selecting access to the outside trunk lines, and a key (INC) for selecting access to a group of said plurality of station sets identified by a common pilot number, means for translating the status of said keys and PCM codes corresponding to the information to be transmitted by said station sets into multibit digital messages including first signalling bits representing the status of said keys, second signalling bits representing the status of telephone functions including hookswitch conditions, and PCM code bits, means in each of said sets for providing a plurality of channels respectively for signals corresponding to signalling messages consisting of said first signalling bits, signalling messages consisting of said second signalling bits, and messages consisting of said PCM codes, computer controller means in each of said station sets responsive to the messages in said signalling channels for controlling the operation of their respective telephone station set, line circuit means connected to said time division switching system and having means for transmitting and receiving said multibit digital messages from said telephone station sets, said line circuit means having signalling channels for messages consisting of said first and second signalling bits and a channel for said PCM codes, said line circuit means also having computer controller means responsive to the messages transmitted by said channels for transmitting messages to and receiving messages from said time division switching system and the processor thereof for operating said station sets in accordance with the status of said ITC, OTG and INC keys in key mode or in PBX mode.

2. The system according to claim 1 wherein said line circuit means and said station sets are interconnected by a single pair of leads, first line interface means in said line circuit means, second line interface means in each of said station sets, said line interface means being transceivers having means for transmitting and receiving said multibit digital messages, said computer controller means in said station sets providing said means for translating said status of said keys and said function status and said PCM codes into said multibit digital messages for transmission on said leads, said computer controller means in said line circuit means having means for operating said means to transmit data in said signalling channels and said PCM codes into the form of said multibit digital messages to said second line interface means.

3. The system according to claim 2 wherein said leads are tip and ring leads of each of said station sets, and said first and second line interface means are digital loop transceivers.

4. The system according to claim 1 wherein said station sets have visual indicator means for calls originating from lines connected to the switching system which are waiting for connections, said line circuit means having means for storing call waiting data representing said waiting calls, one of said signalling channels having means for translating said call waiting data into signalling messages for transmission to said station sets to which said calls are directed, said computer controller means in said station sets having means for operating said call waiting indicator when a call is waiting and for generating a message which is transmitted to said line circuit means and then to said switching system processor to connect the one of said lines having said waiting call to the station set or the member of said group of said station sets to which it is directed with a predetermined priority.

5. The system according to claim 4 wherein said call waiting indicator operating means includes means for changing the rate at which said indication changes in accordance with the number of calls awaiting connection to the station set.

6. The system according to claim 1 wherein said station sets further comprise display means for lines of alpha-numeric characters, means for transmitting, via one of the signalling channels in said line circuit means and one of said signalling channels in said station set with said signalling bits of said multibit digital messages, messages representing said characters and their positions along said lines, and said computer controller means in said station sets having means for operating said display means in response to said character an character position representing messages.

7. The system according to claim 6 wherein said display means has two lines, one for characters representing the call which is directed to that station and the other for characters representing the status of certain other lines in said system, and means for transmitting via said signalling channels and with the signalling bits of said multibit messages data representing the line status characters for said other line of said display.

8. The system according to claim 1 wherein said line circuit means has address decoder means responsive to address and control data from the processor of said switching system for enabling the transfer of PCM codes and signalling data from the switching system to said line circuit means, data buffer storage means for providing storage in said signalling channels, formatting circuit means for translating said PCM data into said multibit messages and vice versa, line interface means for transmitting and receiving said multibit messages, and means connecting said buffer means and said line interface means in controlled relationship with said computer controller means of said line circuit means.

9. The system according to claim 8 wherein said formatting means includes means for formatting said PCM codes into a first plurality of bits of said multibit messages representing voice data and at least one bit representing digital data.

10. The system according to claim 9 wherein said station sets have means for translating voice into a plurality of the PCM bits of said multibit messages and data into at least one of the PCM bits of said messages.

11. The system according to claim 10 wherein said station sets each has line interface means for transmitting and receiving said digital messages to the line interface means of said line circuit means, and voice/data selector means for selectively replacing the voice representing bits of said multibit messages with digital data representing data bits thereby increasing the data transmission rate of said system.

12. A key telephone system which comprises a key telephone set to which a station number and a key group number are assigned, said set having a first key (OTG) for selecting and originating a connection to any available one of a plurality of trunk circuits when operated, a second key (INC) for making the set available for connection to receive incoming calls directed to the key group number when operated, and a third key (ITC) for enabling said first and second keys to be operable when said third key is operated, and computer controlled switching means responsive to the state of said first, second and third keys for making multiple line and trunk connections to said set solely with said three keys.

13. The system according to claim 12 further comprising means for providing PBX mode of operation of said set when said third key is not in its operated state.

14. The system according to claim 12 wherein a plurality of said telephone sets are assigned to said key group number, and said computer controlled switching means includes means for distributing said incoming calls in the order of the longest waiting call first to each of said plurality of sets which has its INC key operated to answer.

* * * * *